US008042438B2

(12) United States Patent
Huang

(10) Patent No.: US 8,042,438 B2
(45) Date of Patent: Oct. 25, 2011

(54) CUTTING APPARATUS WITH VIBRATOR

(75) Inventor: Chien-Feng Huang, Taipei Hsien (TW)

(73) Assignee: Hon Hai Precision Co., Ltd., Tu-Cheng, New Taipei (TW)

( * ) Notice: Subject to any disclaimer, the term of this patent is extended or adjusted under 35 U.S.C. 154(b) by 737 days.

(21) Appl. No.: 12/139,084

(22) Filed: Jun. 13, 2008

(65) Prior Publication Data

US 2009/0123239 A1 May 14, 2009

(30) Foreign Application Priority Data

Nov. 14, 2007 (CN) .......................... 2007 1 0202542

(51) Int. Cl.
*B23B 25/00* (2006.01)
*B23P 15/00* (2006.01)

(52) U.S. Cl. ................. 82/163; 82/904; 407/33; 407/79

(58) Field of Classification Search .................... 82/163, 82/904; 407/33, 79; 409/141; 408/143
See application file for complete search history.

(56) References Cited

U.S. PATENT DOCUMENTS 3,211,353 A * 10/1965 Belardi et al. .................. 228/54
3,468,203 A * 9/1969 Armelin et al. .................. 83/433
3,538,523 A * 11/1970 Sparks .............................. 7/103
4,437,238 A * 3/1984 Coleman ...................... 30/277.4
4,662,066 A * 5/1987 Toman et al. ................... 29/854
5,632,187 A * 5/1997 Speich .............................. 83/16

FOREIGN PATENT DOCUMENTS

CN 1083763 C 5/2002
CN 1970250 A 5/2007
WO WO 2005/030443 * 4/2005 ...................... 30/123

* cited by examiner

*Primary Examiner* — Will Fridie, Jr.
(74) *Attorney, Agent, or Firm* — Altis Law Group, Inc.

(57) ABSTRACT

An exemplary cutting apparatus for cutting a workpiece includes a base, a cutting device and a first driving device. The cutting device is movably mounted on the base. The cutting device includes a first blade and a first vibrator. The first blade is movable in a moving direction toward the workpiece. The first vibrator is configured for vibrating the first blade to increase a shearing force applied to the workpiece. The first driving device is configured for driving the first blade to move.

20 Claims, 4 Drawing Sheets

CUTTING APPARATUS WITH VIBRATOR

BACKGROUND

1. Technical Field

The present invention relates to cutting apparatuses, particularly to a cutting apparatus with vibrator for cutting off a lens preform made by injection molding to form a number of lenses.

2. Description of related art

Nowadays, camera modules are combined with various portable electronic devices such as mobile phones, personal digital assistants (PDAs), and laptop computers to be increasingly multi-functional. A lens module is a very important component of the camera module. Generally, the lens module includes a holder, a barrel, an image sensor, and a number of optical components such as optical lenses and filters received in the barrel. Plastic optical lenses are widely used in many lens modules as they can be easily manufactured using an injection molding process. Plastic optical lenses play an important role in reducing volumes of lens modules and decreasing numbers of the optical lenses used in lens modules.

During manufacturing the plastic optical lenses using the injection molding process, a number of the plastic optical lenses, e.g., four plastic optical lenses and eight plastic optical lenses, are injection molded. Theses injection molded plastic optical lenses is connected to a stub bar, thereby forming a lens preform. Typically, each of the plastic optical lenses is cut from the stub bar at a sprue position between the plastic optical lens and the stub bar using a blade, thereby forming a number of separated plastic optical lenses.

However, during using the typical blade to cut the plastic optical lenses from the stub bar, an amount of cutting plastic bits generate and attach onto the blade. As a result, the blade becomes blunt due to the attached cutting plastic bits. When the blunt blade continuingly cut the plastic optical lenses from the stub bar, fissures and burrs are formed on the plastic optical lens products. As the plastic optical lenses become even smaller and smaller, the fissures and burrs formed during the cutting process evidently affect quality of the plastic optical lens products, thereby further affecting quality of the lens module using the plastic optical lens products.

What is needed, therefore, is a cutting apparatus capable of preventing fissures and burrs occurring on the plastic lenses during the cutting process.

SUMMARY

One present embodiment provides a cutting apparatus for cutting a workpiece. The cutting apparatus includes a base, a cutting device and a first driving device. The cutting device is movably mounted on the base. The cutting device includes a first blade and a first vibrator. The first blade is movable in a moving direction toward the workpiece. The first vibrator is configured for vibrating the first blade to increase a shearing force applied to the workpiece. The first driving device is configured for driving the first blade to move.

BRIEF DESCRIPTION OF THE DRAWINGS

Many aspects of the present embodiments can be better understood with reference to the following drawing. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Figure 1:
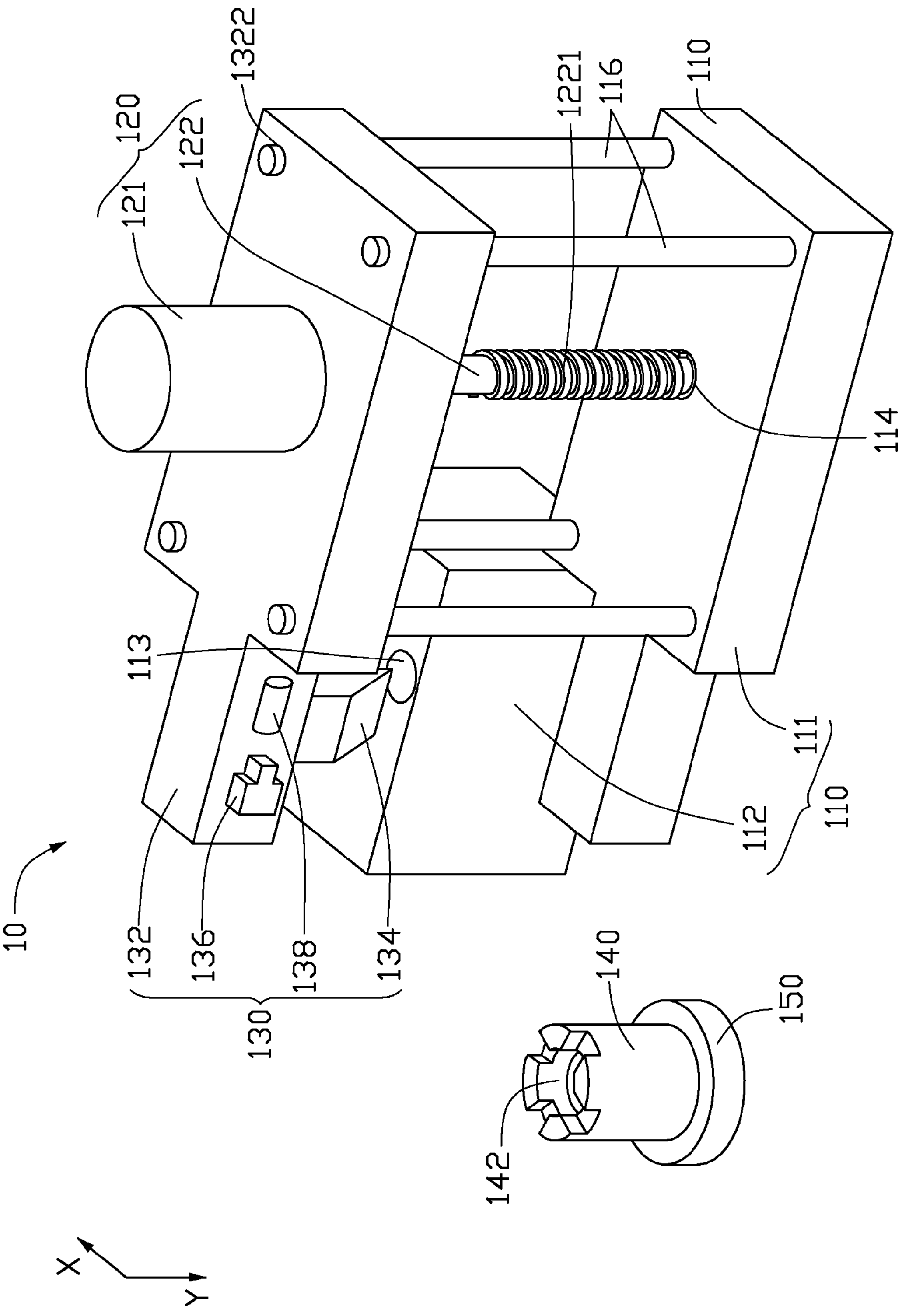
FIG. 1 is a schematic view of a cutting apparatus according to a first present embodiment.

Embodiments will now be described in detail below and with reference to the drawing.

Referring to FIG. 1, an exemplary cutting apparatus 10, according to a first present embodiment, includes a base 110, a first driving device 120, and a cutting device 130.

In the present embodiment, the base 110 includes a first base 111 and a second base 112 adjacent to the first base 111. The first base 111 has a number of guiding posts 116 disposed thereon. In the illustrated embodiment, four guiding posts 116 are respectively disposed on the first base 111 perpendicularly. The first base 111 defines a screw hole 114 therein. A central axis of the screw hole 114 is parallel to a lengthwise direction (Y axis direction in FIG. 1) of each of the guiding posts 116. The second base 112 defines a receiving cavity 113 therein. The receiving cavity 113 is configured for receiving a lens cut from a lens preform by the cutting device 130.

The first driving device 120 includes a driver 121 and a rotary shaft 122 connecting to the driver 121. The driver 121 is configured for driving the rotary shaft 122 to rotate. The driver 121 is mounted on the cutting device 130. The rotary shaft 122 has a screw thread 1221 on an outer surface thereof. One end of the rotary shaft 122 connects to the driver 121 so that the driver 121 drives the rotary shaft 122 to rotate around a central axis thereof. The other end of the rotary shaft 122 is threadedly engaged with the screw hole 114 by coupling the screw thread 1221 with the screw thread of the screw hole 114. The first driving device 120 is configured for driving the cutting device 130 to move with respect to the base 110 in the lengthwise direction (Y axis direction in FIG. 1) of each of the guiding posts 116. The lengthwise direction (Y axis direction in FIG. 1) is a moving direction of the cutting device 130.

In the illustrated embodiment, the cutting device 130 include a rest 132, a first blade 134 and a first vibrator 136. The rest 132 is configured (i.e., structured and arranged) for mounting the first blade 134 and the first vibrator 136 thereon. The rest 132 is movably mounted on the first base 111. In detail, in the present embodiment, the rest 132 defines four through holes 1322 therein. Each of the four guiding posts 116 penetrates through the corresponding through hole 1322. Additionally, the rest 132 is configured (i.e., structured and arranged) for disposing the first driving device 120 thereon. In the present embodiment, the driver 121 of the first driving device 120 is mounted on the rest 132 and the rotary shaft 122 of the first driving device 120 penetrates through the rest 132 and threadedly engaged with the screw hole 114 of the first base 111. Thus, the rest 132 of the cutting device 130 is movably mounted on the guiding posts 116. The rest 132 can move with respect to the first base 111 in the lengthwise direction of the guiding posts 116 (Y axis direction in FIG. 1) by driving of the first driving device 120.

The first blade 134 is mounted on the rest 132 and corresponds to the receiving cavity 113 of the second base 112. The first blade 134 is configured for cutting a lens from a lens preform to be received in the cavity 113. The lengthwise direction (Y axis direction in FIG. 1) is the moving direction of the first blade 134.

The first vibrator 136 is also mounted on the rest 132. The first vibrator 136 is configured for vibrating the rest 132 so as to vibrate the first blade 134 mounted on the rest 132, thereby increasing a shearing force applied to a workpiece. An angle of a vibrating direction and the moving direction can either be an acute angle or a rectangular angle. In the present embodiment, the first vibrator 136 vibrates in a direction (X axis direction in FIG. 1) substantially perpendicular to the moving direction of the first blade 134. The vibrator 136 can either be an ultrasonic vibrator or an electromagnetic vibrator. In the present embodiment, the first vibrator 136 is an ultrasonic vibrator. The ultrasonic vibrator includes a piezoelectric material and two electrodes connected to the piezoelectric material. The two electrodes electrically connect to a power supply. When an electric pressure is applied to the two electrodes, the piezoelectric material will generate a vibration with an ultrasonic frequency. The piezoelectric material can either be a piezoelectric ceramic material such as barium titanate and lead zirconate titanate or a piezoelectric crystal material such as quartz, lithium niobate and lithium germanate.

Preferably, the cutting device 130 includes a first heating device 138 mounted on the rest 132. The first heating device 138 is configured for heating the first blade 134.

Advantageously, the cutting apparatus 10 includes a supporting member 140 and a second driving device 150 connecting to the supporting member 140. The supporting member 140 is configured (i.e., structured and arranged ) for placing a lens preform thereon. The supporting member 140 defines a cutout 142 for receiving the stub bar of the lens perform. The cut out 142 mates with the stub bar of the lens perform. The second driving device 1 50 is configured for driving the supporting member 140 to rotate around a central axis thereof. Thus, each lens of the lens preform supported by the supporting member 140 can be received in the receiving cavity 113 in sequence, thereby being cut by the first blade 134.

Figure 2:
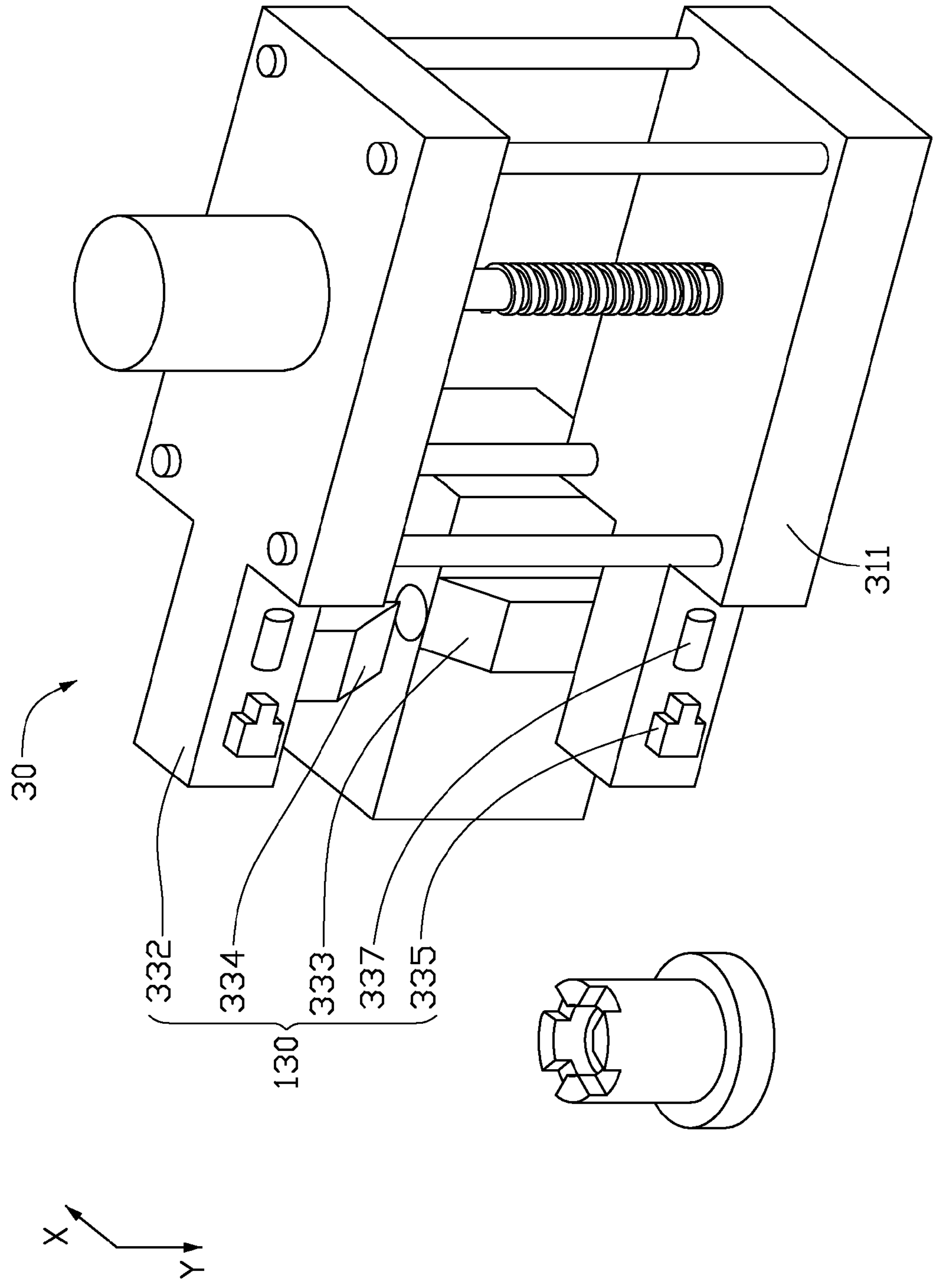
FIG. 2 is a schematic view of a cutting apparatus according to a second present embodiment.

Referring to FIG. 2, an exemplary cutting apparatus 30, according to a second present embodiment is shown. The cutting apparatus 30 is similar to the cutting apparatus 10 except that the cutting device 330 includes a second blade 333, a second vibrator 335, and a second heating device 337. The second blade 333 is mounted on the first base 311. The second blade 333 mates with the first blade 334 mounted on the rest 332 so as to cut a lens from a lens preform. The second vibrator 335 and the second heating device 337 are mounted on the first base 311. The second vibrator 335 is configured for vibrating the first base 311, thereby vibrating the second blade 333 mounted on the first base 311 in the direction (X axis direction in FIG. 2) substantially perpendicular to the moving direction (Y axis direction in FIG. 2) of the cutting device 330. The second heating device 337 is configured for heating the second blade 334.

An exemplary method for cutting a lens preform 20 (shown in FIG. 3) using the cutting apparatus 10 includes the following steps.

Step 1: a lens preform 20 is prepared on the cutting apparatus 10 to be cut.

Figure 3:
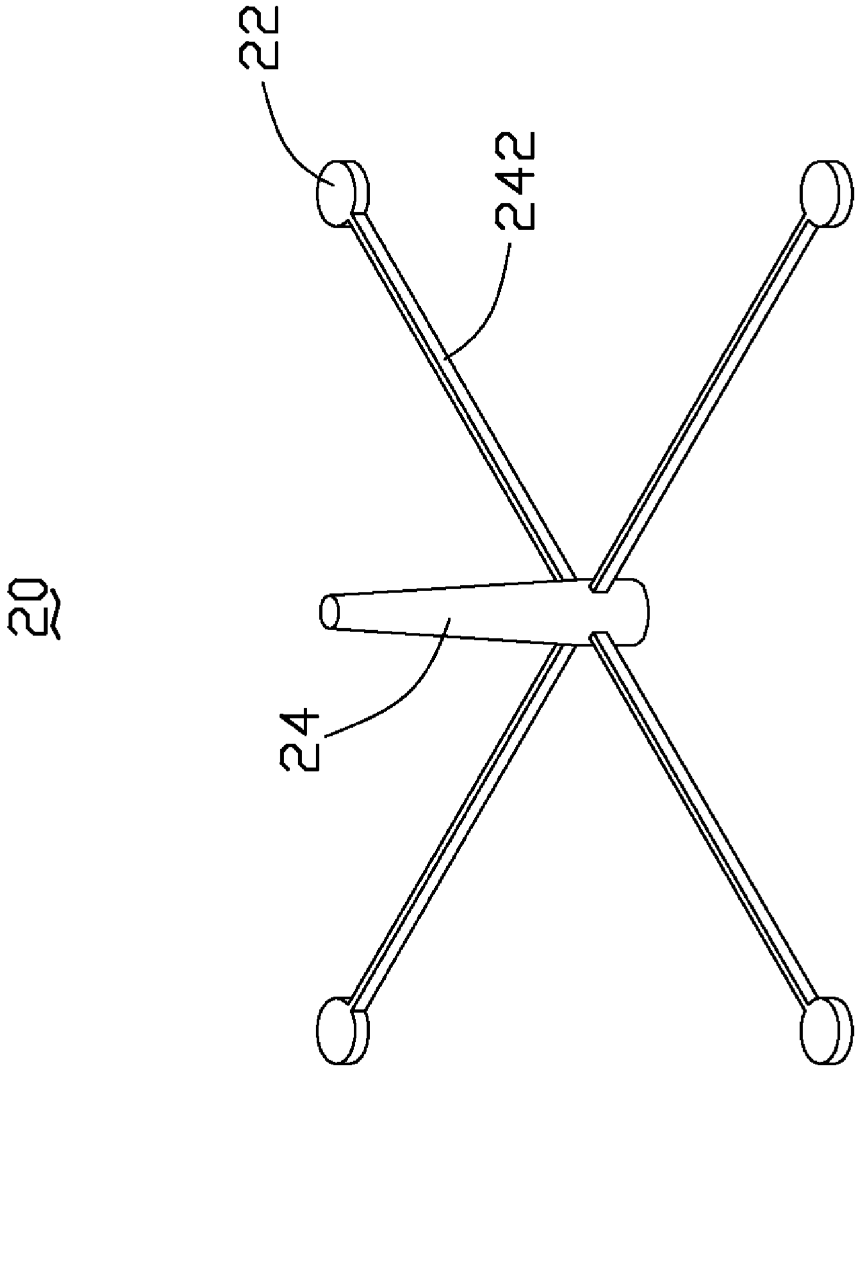
FIG. 3 is a schematic view of a lens preform.

Referring to FIG. 3, the lens preform 20 is manufactured by an injection molding process. The lens preform 20 includes a stub bar 24 having a number of branches 242, e.g., four branches 242 in the illustrate embodiment. A lens 22 connects to the end of each of the branches 242.

Figure 4:
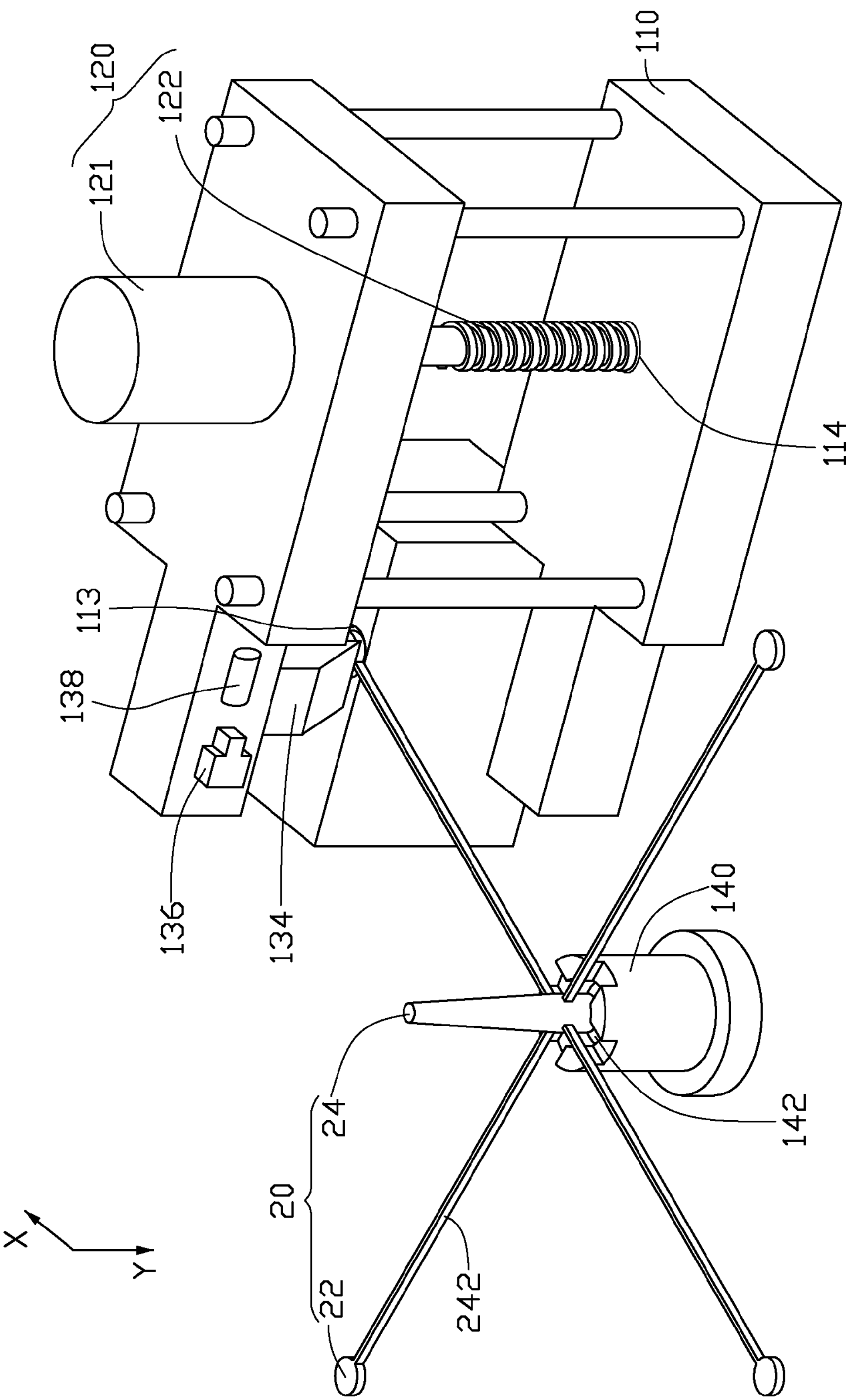
FIG. 4 is a schematic view of the lens preform shown in FIG. 3 is mounted on the cutting apparatus shown in FIG. 1.

In the present embodiment, referring to FIG. 4, the lens preform 20 is mounted on the supporting member 140. The stub bar 24 having the four branches 242 is received in the cutout 142 of the supporting member 140. Meanwhile, one lens 22 of the lens preform 20 is received in the receiving cavity 113 with a sprue position (i.e., an connecting portion of the one lens 22 and the corresponding branch 242) corresponds to the first blade 134.

Step 2: the cutting device 130 is moved so that the first blade 134 cuts one of the lens of the lens preform 20 while the first vibrator 136 vibrating the first blade 134 to increase a shearing force applied to the lens preform 20.

Before cutting, the first heating device 138 heats the first cutting device 134. Then, the driver 121 of the first driving device 120 drives the rotary shaft 122 to rotate, thereby screwing the rotary shaft 122 into the screw hole 114. Thus, the rest 132 moves with respect to the first base 111 in the lengthwise direction (Y axis positive direction in FIG. 4) of the guiding posts 116. The first blade 134 cuts the connecting portion of the one lens 22 and the corresponding branch 242 so as to separate the one lens 22 from the stub bar 24. The one separated lens 22 is received in the receiving cavity 113. During the movement of the first blade 134, the first vibrator 136 vibrates the rest 132 to vibrate the first blade 134 to increase the shearing force applied to the lens preform 20. An angle of the vibrating direction and the moving direction can either be an acute angle or a rectangular angle. In the present embodiment, the first vibrator 136 vibrates the rest 132 so as to vibrate the first blade 134 in the direction (X axis direction in FIG. 4) substantially perpendicular to the moving direction (Y axis positive direction in FIG. 4). Thus, cutting bits formed in the cutting process can not attach onto the first blade 134 to blunt the first blade 134, thereby preventing fissures and burrs from the one lens 22.

It is noted that the cutting apparatus 30 can also be used to cut the lens preform 20. Similarly, the second blade 333 can be heated by the second heating device 337 before cutting. The second vibrator 335 vibrates the first base 311 so as to vibrate the second blade 333 to further increase a shearing force applied to the lens preform 20. An angle of a vibrating direction and the moving direction can either be an acute angle or a rectangular angle. Preferably, the second vibrator 335 vibrates the first base 311 so as to vibrate the second blade 333 in the direction (X axis direction in FIG. 2) substantially perpendicular to the moving direction (Y axis positive direction in FIG. 2). The cutting apparatus 30 has a higher cutting efficiency and better cutting quality than the cutting apparatus.

Finally, the one lens 22 cut from the stub bar 24 is taken out of the receiving cavity 113. The second driving device 150 drives the supporting member 140 to rotate so that another one lens 22 of the lens preform 20 is received in the cavity 113 to be cut by the cutting device 130.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A cutting apparatus for cutting a workpiece, comprising:

a base;

a cutting device movably mounted on the base, the cutting device comprising a first blade and a first vibrator coupled to the first blade, the first blade being movable in a moving direction toward the workpiece, the first vibrator being configured for vibrating the first blade to increase a shearing force applied to the workpiece, the first vibrator being an ultrasonic vibrator, and comprising a piezoelectric material and two electrodes connected to the piezoelectric material; and a first driving device configured for driving the first blade to move.

2. The cutting apparatus as claimed in claim 1, wherein the first vibrator is capable of vibrating the first blade in a direction substantially perpendicular to the moving direction of the first blade.

3. The cutting apparatus as claimed in claim 1, wherein the base comprises a first base and a second base adjacent to the first base, the first base has a plurality of guiding posts disposed thereon, and the second base defines a receiving cavity therein.

4. The cutting apparatus as claimed in claim 3, wherein the cutting device comprises a rest, the plurality of guiding posts penetrate through the rest so that the rest is movably mounted on the plurality of guiding posts, and the first blade and the first vibrator are mounted on the rest.

5. The cutting apparatus as claimed in claim 4, wherein the first driving device comprises a driver mounted on the rest and a rotary shaft threadedly engaged with the first base, and the driver is configured for driving the first blade to move by rotating the rotary shaft relative to the first base.

6. The cutting apparatus as claimed in claim 1, wherein the cutting device comprises a first heating device for heating the first blade.

7. The cutting apparatus as claimed in claim 1, wherein the piezoelectric material is either a piezoelectric ceramic material or a piezoelectric crystal material.

8. The cutting apparatus as claimed in claim 1, wherein the cutting device comprises a second blade and a second vibrator mounted on the base, the second blade mates with the first blade, and the second vibrator is configured for vibrating the second blade to increase a shearing force applied to the workpiece.

9. The cutting apparatus as claimed in claim 8, wherein the second vibrator is capable of vibrating the second blade in a direction substantially perpendicular to the moving direction of the first blade.

10. The cutting apparatus as claimed in claim 8, wherein the cutting device comprises a second heating device for heating the second blade.

11. The cutting apparatus as claimed in claim 8, wherein further comprises a supporting member and a second driving device for drive the supporting member to rotate.

12. A cutting device comprising:

a blade for cutting a molding material; and a vibrator for generating a vibration of the blade to increase a shearing force applied to the molding material, the vibrator being an ultrasonic vibrator, and comprising a piezoelectric material and two electrodes connected to the piezoelectric material.

13. The cutting device as claimed in claim 12, wherein the vibration direction of the blade is substantially perpendicular to a main plane of the blade.

14. The cutting apparatus as claimed in claim 12, wherein the piezoelectric material is a piezoelectric ceramic material or a piezoelectric crystal material.

15. A cutting apparatus for cutting a workpiece, comprising:

a base comprising a first base and a second base adjacent to the first base, the first base having a plurality of guiding posts disposed thereon, and the second base defining a receiving cavity therein;

a cutting device movably mounted on the base, the cutting device comprising a first blade, a first vibrator coupled to the first blade, and a rest, the first blade being movable in a moving direction toward the workpiece, the first vibrator being configured for vibrating the first blade to increase a shearing force applied to the workpiece, the plurality of guiding posts penetrate through the rest so that the rest being movably mounted on the plurality of guiding posts, and the first blade and the first vibrator being mounted on the rest; and a first driving device configured for driving the first blade to move.

16. The cutting apparatus as claimed in claim 15, wherein the first driving device comprises a driver mounted on the rest and a rotary shaft threadedly engaged with the first base, and the driver is configured for driving the first blade to move by rotating the rotary shaft relative to the first base.

17. The cutting apparatus as claimed in claim 15, wherein the first vibrator is an ultrasonic vibrator, and comprises a piezoelectric material and two electrodes connected to the piezoelectric material.

18. The cutting apparatus as claimed in claim 15, wherein the piezoelectric material is a piezoelectric ceramic material or a piezoelectric crystal material.

19. The cutting apparatus as claimed in claim 15, wherein the cutting device comprises a second blade and a second vibrator mounted on the base, the second blade mates with the first blade, and the second vibrator is configured for vibrating the second blade to increase a shearing force applied to the workpiece.

20. The cutting device as claimed in claim 12, wherein further comprising a heater for heating the blade.

* * * * *